Figure 1:

(No Model.)

A. A. ACKERMAN.
MANUFACTURE OF ARMOR PLATES.

No. 518,908. Patented Apr. 24, 1894.

Fig. 3ª.

Witnesses
Percy C. Bowen
John O. Wilson

Inventor
A. A. Ackerman,
By Whitman & Wilkinson,
Attorneys.

THE NATIONAL LITHOGRAPHING COMPANY,
WASHINGTON, D. C.

UNITED STATES PATENT OFFICE.

ALBERT A. ACKERMAN, OF THE UNITED STATES NAVY, ASSIGNOR OF ONE-HALF TO THOMAS T. CRITTENDEN, OF WASHINGTON, DISTRICT OF COLUMBIA.

MANUFACTURE OF ARMOR-PLATE.

SPECIFICATION forming part of Letters Patent No. 518,908, dated April 24, 1894.

Application filed October 26, 1893. Serial No. 489,195. (No model.)

*To all whom it may concern:*

Be it known that I, ALBERT A. ACKERMAN, a lieutenant in the United States Navy, attached to the Bureau of Ordnance, Navy Department, Washington, in the District of Columbia, have invented certain new and useful Improvements in the Manufacture of Armor-Plates; and I do hereby declare the following to be a full, clear, and exact description of the invention, such as will enable others skilled in the art to which it appertains to make and use the same.

My invention relates to improvements in the manufacture of armor plates or other like castings or forgings, and is especially adapted for use in hardening and toughening the surface of such plates.

It is well known that, other things being equal, the loss of heat of a solid body through radiation, varies with the area of the radiating surface; and also that the increase of heat through absorption varies with the area of the surface exposed to the heat rays; from this it follows that where two sides or faces of a plate are of unequal surface, then the side having the greater surface is capable of being more rapidly heated or cooled than the opposite side; thus where one side of a plate is corrugated and the other side smooth, or comparatively smooth, the corrugated side will absorb and radiate heat more rapidly than the smooth side and hence a desired temperature may be reached on that side, and in these corrugations and enlargements earlier and with less expense for fuel and labor than when, as is the case on the smooth side, the receiving surface is smaller, and the section through which heat flows away into the body of the plate is greater. Again, where heated plates having parallel smooth faces are cooled, in hardening or toughening the outer edges and corners of the plate cool more rapidly that the central portion, producing an initial "set" of the outer portions and causing the central portion as it cools to assume a stress due to its contraction within the fixed bounds of the outer and colder portions. This produces inequalities in structural strength in the plate and weakness in places. This may be avoided by so increasing the area of radiating surface near the center of the plate that the loss of heat may be approximately uniform all over the area of the surface of the plate. Again, it has been found, where armor plates have been heated to a high temperature and then gradually cooled, the one face being cooled more rapidly than the other, that the face cooling faster first assumes a "set" to which the entire mass of material adapts itself; and that when the slower cooling portion becomes rigid, the plate is "buckled" toward the side last cooling. This may be avoided by constructing the plate with radiating surfaces so arranged that, although the media into which the radiation takes place may differ, the amount of heat radiated from each side of the plate may be practically the same; and thus there may be no tendency of the plate to "buckle." Or this tendency to "buckle" may be regulated by varying the surfaces of the two sides of the plate. Since the effect of these variations in the surface giving out or absorbing heat will depend upon so many things in or around the furnace, it will be impossible, at present, to lay down any fixed rule, but the variations will probably have to be determined by experiment in each particular furnace. Again, in the Harvey and kindred processes, where elements or compounds are caused by means of heat to impregnate the surface of armor plates, the penetration of these foreign substances extends only to a limited distance from the surface, and varies to a certain extent inversely as the depth therefrom; now if by deep cuts or corrugations, or pockets, the area of the surface is increased, then the amount of material affected by these hardening and toughening agents is increased; and if these projections or corrugations be rolled or pressed down afterward to form a smooth surface, then the depth of Harveyized material under that surface will be increased approximately in proportion to the comparative areas of the surfaces before and after rolling. Moreover, where a given thickness of impregnated material is desired, the time necessary for carrying out the process will be shortened in proportion to the increased area of exposed surface. This is very important as the time required for treating an armor plate under the Harvey process is ordinarily from ten days to three weeks, entailing great expense in maintaining the amount of heat required. My process also diminishes the serious scaling in such processes of cementation or conversion both by decreasing the time and by permitting the same effects to be obtained at a lower temperature, thus, in the latter case, extending the life of the furnace. Since the higher percentage of graphitic carbon renders that part of the plate softer at the same high temperature, these carburized corrugations or projections are readily rolled or pressed down into a smooth surface without danger of overheating the plate. In addition, work done on the plate will be concentrated on this corrugated surface due to its greater softness, thus improving that surface which is exposed to greatest strains and which in the unworked surfaces of other processes is known to be lowered in quality and toughness by the heterogeneous mixture of graphitic carbon. Moreover, by this means, the percentage and extent of carburization may be controlled by the shape and dimensions of ridges or corrugations; that is, when these ridges are made narrow and deep, the percentage of carbon will be high while the depth of its penetration will be comparatively slight. By introducing other shapes, the gradation of carbon from the carburized to the uncarburized portion of the plate may be made more or less abrupt, superficial, or deep, and in this way a high carbonizing and hence great hardening effect may be extended deeply into the plate, without permitting the loss of toughness to lower the quality of a large depth of plate. This applies particularly to the case where carburizing is applied directly to the ingot on which these ridges are provided, the metal in this case being subjected to an annealing process, as it were, while the carburizing is being carried on. The ingot will not only be benefited by the annealing process, but the specific gravity of the metal, being less than in the forged metal, the process will be more rapid. And by means of the enlargements of surface as herein-described, the carburizing in any form may be carried to any desired depth without rendering the back of the plate brittle or too high in carbon.

Figure 2:
Figure 3:
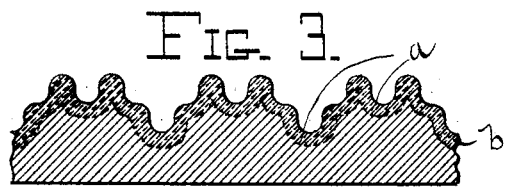
Figure 4:
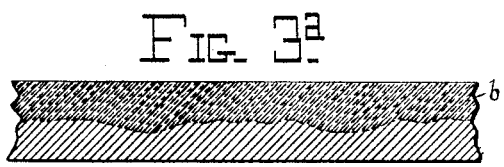
Figure 4:
Figure 5:
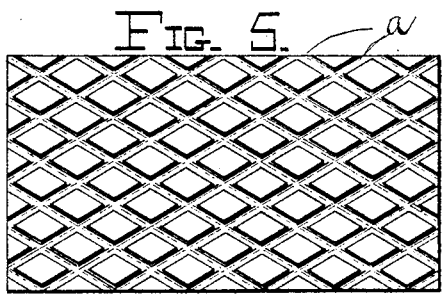
Figure 6:
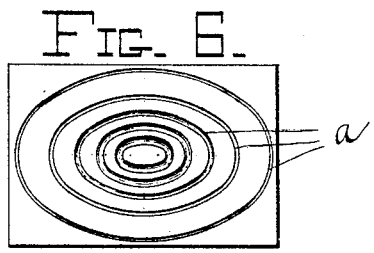
Figure 7:
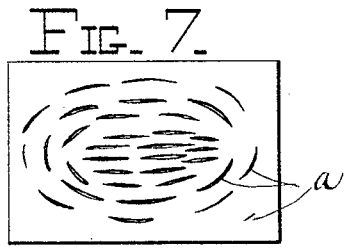
Figure 8:
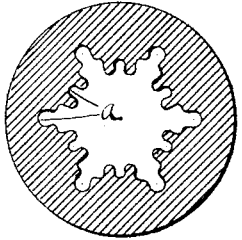
Figure 9:
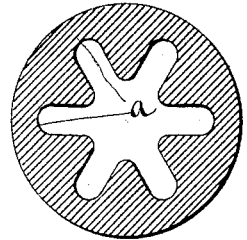
Figure 10:
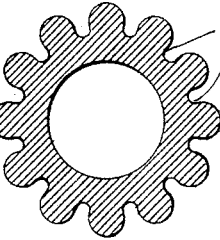
Figure 11:
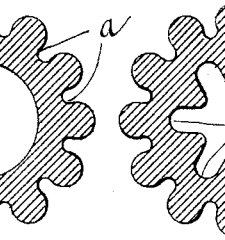
Figure 12:
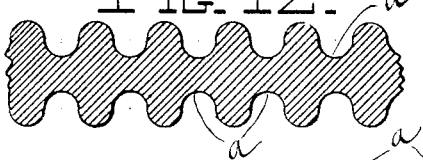
Figure 13:
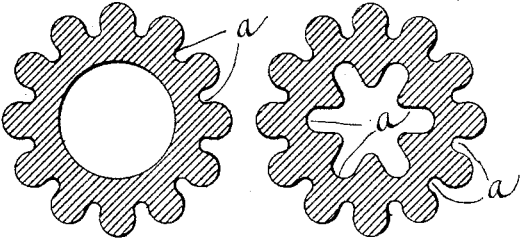
Figure 14:
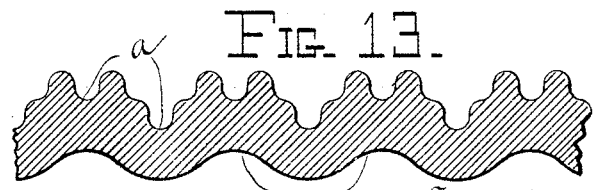

Figures 1 and 2 represent cross sections of plates having one side or face smooth and the other face corrugated or dentated as at $a$. Fig. 3 represents a cross section of an armor plate that has its front face indented with compound corrugations as at $a$. The shaded portion $b$ of the said plate indicates the depth to which the carburizing of said plate would extend. Fig. 3$^a$ represents a cross section of the same plate shown in Fig. 3 after the corrugations are rolled down; the carburized portion $b$ of the plate being represented by shade lines. Fig. 4 represents a cross section of a carburized indented plate, the carburization being shown in shaded lines as at $b$. When rolled out flat this plate would resemble that shown in Fig. 3$^a$. Fig. 5 represents a front view of a plate having its radiating or absorbing surface increased by a plurality of hatchings $a$ crossing each other in the face of the plate. Fig. 6 represents a front view of a plate provided with a number of elliptical grooves $a$ in the face thereof, the said grooves being spaced farther apart toward the outer edges of the plate whereby the radiating surface of the center of the plate may be increased, and the plate may be caused to cool more uniformly. Fig. 7 is similar in every respect to Fig. 6, except that the elliptical grooves are replaced by coarse indentations or chiselings $a$, which are deeper and more frequent near the center of the plate than toward the edges thereof, whereby greater uniformity in the cooling of the plate is obtained. Figs. 8 and 9 represent cross sections of hollow cylindrical bodies having their radiating interior surfaces largely increased by indentations such as are shown at $a$. The tendency of hollow cylinders constructed in these shapes would be to facilitate the transmission of heat from without and to retard the transmission of heat from within. This construction would rather be of advantage for water tubes for boilers than for armor however. It will be evident that forgings or castings of this shape might be carburized from both sides and thus completely through. Fig. 10 represents a cross section of a stellated body indented as at $a$ and inclosing a cylindrical chamber. Armor for conning towers, smoke stacks, and the like might be readily carburized while in this shape and then forged down to a cylindrical exterior thus giving greater depth to the carburized surface than where cylindrical bodies are so treated. Fig. 11 illustrates a combination of the types shown in Figs. 9 and 10 and represents a steel casting or forging readily adapted for carburizing from both sides or all the way through. Fig. 12 represents a cross section of a steel plate corrugated as at $a$ on both sides, and adapted to be carburized on either or both sides, and to radiate heat as readily from one side as from the other; and Figs. 13 and 14 represent cross-sections of plates unevenly indented as at $a$ upon opposite sides and adapted to radiate heat faster from one side than from the other. These various figures represent types of either castings or forgings on which these increased surfaces have been provided in any convenient way. These castings or forgings are treated by any of the herein described processes, and may be then either left with the ridges intact, or may be forged an approximately smooth surface.

The depth of the indentations $a$ may not be nearly so deep, relatively, as is shown in the drawings, but the larger the increase of surface the more pronounced will be the effect.

It will be evident, while I have particularly described the advantages of my invention with regard to the carburization, that it is equally applicable to those processes wherein chromium, nickel, nitrogen and other elements or compounds are introduced into the metal and it is also applicable to all processes of cementation, conversion, case hardening, tempering, and annealing.

From the foregoing it will be seen that my invention consists in so varying the area of surface on one or both sides of the plate or mass of material to be subjected to heat or chemical treatment, that the mass may be more readily affected by thermal or chemical agents.

Having thus described my invention, what I claim, and desire to secure by Letters Patent of the United States, is—

In the manufacture of armor plates, the method of treating the plate or ingot which consists in providing on one of the faces thereof a plurality of grooves or corrugations, in heating the surface so increased in contact with a carburizing agent, in removing the unabsorbed portion of the carburizing agent from the plate, and in forging the projections down to an approximately smooth surface, substantially as and for the purposes described.

In testimony whereof I affix my signature in presence of two witnesses.

ALBERT A. ACKERMAN.

Witnesses:
   JOHN C. WILSON,
   PERCY C. BOWEN.